(12) United States Patent
Shibuta

(10) Patent No.: US 6,816,543 B1
(45) Date of Patent: Nov. 9, 2004

(54) SPREAD SPECTRUM COMMUNICATION APPARATUS AND SYNCHRONIZATION ACQUISITION METHOD THEREIN

(75) Inventor: Akira Shibuta, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 794 days.

(21) Appl. No.: 09/654,730

(22) Filed: Sep. 5, 2000

(30) Foreign Application Priority Data

Sep. 3, 1999 (JP) .......................................... 11-250010

(51) Int. Cl.$^7$ .............................. H04J 13/04; H04L 7/00
(52) U.S. Cl. ...................... 375/149; 375/150; 370/503
(58) Field of Search ................................. 375/142, 145, 375/149, 150–153, 343, 354, 362; 370/503

(56) References Cited

U.S. PATENT DOCUMENTS 6,067,314 A * 5/2000 Azuma ........................ 375/147
6,487,237 B1 * 11/2002 Imaizumi .................... 375/149
6,556,620 B1 * 4/2003 Ohnishi ....................... 375/149

FOREIGN PATENT DOCUMENTS

JP          3-236645       10/1991
JP          10-112672      4/1998

* cited by examiner

*Primary Examiner*—Amanda T. Le
(74) *Attorney, Agent, or Firm*—RatnerPrestia

(57) ABSTRACT

A spread spectrum communications apparatus for synchronizing a received spread spectrum modulated signal and a de-spreading code, and its synchronization acquisition method are disclosed. In the first synchronization acquisition operation, the phase of the de-spreading code is sequentially changed finely depending on the number of chips, and the correlation value of the spread spectrum modulated signal and de-spreading code is detected. Further, the maximum value and average of the correlation value for the number of times of detection are determined. When the maximum value is judged to be larger than the sum of the average and a specified threshold level, the first acquisition operation is completed. Consequently, the process is advanced to a second synchronization acquisition operation for determining the phase for establishing the synchronization by changing finely the phase of the de-spreading code before and after the phase corresponding to the maximum value.

13 Claims, 8 Drawing Sheets

SPREAD SPECTRUM COMMUNICATION APPARATUS AND SYNCHRONIZATION ACQUISITION METHOD THEREIN

FIELD OF THE INVENTION

The present invention relates to a spread spectrum communications apparatus composed of a transmitter and a receiver conforming to a spread spectrum communication system, and a synchronization acquisition method therein.

BACKGROUND OF THE INVENTION

Recently, since the Federal Communications Commission has released the ISM (industrial, scientific and medical) band for spread spectrum communications, products conforming to the spread spectrum communication system have been introduced in various communication appliance fields such as cordless telephones. The spread spectrum communication system features an excellent resistivity of interference and communication security. When employing this system, the FCC permits transmission at a larger output than in the conventional analog communication system. It is therefore an advantage of this system that the communication distance can be extended. On the other hand, products conforming to this system are generally based on the digital communication system, and are hence complicated and expensive as compared with the products of the conventional analog communication system. In such a background, by adding simple circuits for spreading and de-spreading to the conventional analog communications apparatus, an inexpensive spread spectrum communications apparatus is proposed. This spread spectrum communications apparatus based on the analog communication system has the following merits.

i) The frequency demodulator is higher in receiving sensitivity as compared with the demodulator of digital system, so that the communication distance can be extended.

ii) In sound transmitting system, in particular, since coding of sound is not needed, there is no delay of sound due to encoder.

An outline of a prior art of spread spectrum communications apparatus on the basis of analog communication system and its problems are explained below by referring to the drawings.

FIG. 8 is a block diagram showing a general conventional spread spectrum communications apparatus. A first communication device 1 and a second communication device 41 individually have the own transmitter and receiver, so that they can communicate with each other by wireless means. Information input into the first communication device 1 is modulated by an FM modulator 2, and is output as a narrow-band FM modulated signal 7 which is the same as in the conventional analog communication system. This signal 7 is added, together with a spreading code 8 generated in PN code generator 6, to a spreader 3, and modulated, and output as a spread spectrum modulated signal 9. This signal 9 is further converted to radio frequency in an RF transmitter 4 and then amplified to be an RF signal 10, which is released from a transmitting antenna 5. On the other hand, the RF signal transmitted from the first communication device 1 is received by a receiving antenna 51 of the second communication device 41, and is amplified in an RF receiver 52. An RF spread spectrum modulated signal 59 output from the RF receiver 52 and a de-spreading code 65 generated in a PN code generator 58 are mixed in a de-spreader 53. At this time, async circuit 57 controls the de-spreading code 65 so as to be synchronized with the RF spread spectrum modulated signal 59, and an original narrow-band FM modulated signal 60 is obtained as an output signal of the de-spreader 53. This signal 60 is converted into an intermediate frequency signal 61 in an IF section 54, and filtered, and demodulated in an FM demodulator 55 into an original information signal.

The sync circuit 57 is a kind of sliding correlator making use of the output voltage of Received Signal Strength Indicator (RSSI) of the IF section 54, and the correlation operation is as follows. The de-spreading code 65 used in de-spreading and the spreading code 8 in spreading in the first communication device 1 are exactly the same codes and exactly same in speed. Therefore, by sequentially changing the phase of the de-spreading code 65 for the RF spread spectrum modulated signal 59, and monitoring the output voltage 62 of the RSSI indicating the signal level after being converted and filtered into the intermediate frequency signal 61 by the IF section 54, it is known that a maximum voltage value is obtained when the phase is completely synchronized (when the correlation value of RF spread spectrum modulated signal 59 and de-spreading code 65 are maximum). It means that de-spreading is conducted by tracing and acquiring the phase for obtaining this maximum voltage while sliding the phase of the de-spreading code 65. In the configuration in FIG. 8, the output voltage 62 of RSSI is digitized by an ADC (analog-digital converter) 56, and in order to acquire and hold on the phase for maximizing this data value, the sync circuit 57 adjusts the phase of the PN (pseudo-noise) code generator 58 by a phase control signal 64 (hereinafter, the output voltage of the ADC is called RSSI data or RSSI voltage).

The sync circuit 57 has two operation modes, that is, sync acquisition and sync hold-on. First, the sync acquisition mode determines an approximate sync position of ½ chip unit according to the following procedure (1) to (3).

(1) The de-spreading code 65 is issued from the PN code generator 58 in a proper phase for a specific time, and the RSSI data 63 and the phase of the de-spreading code 65 at this time are recorded.

(2) Shifting the phase by ½ chip, the de-spreading code 65 is output for a specific time, and when the RSSI data 63 at this time is higher than the recorded value at step (1), the recorded value is updated.

(3) The same procedure is repeated for all phases in ½ chip unit, and jumping to the phase (sync point) corresponding to the maximum value of the obtained RSSI data 63, the sync acquisition is completed.

In the sync hold-on mode following the completion of sync acquisition, the phase is adjusted more finely (for example, ⅛ chip) from the sync point obtained in the sync acquisition mode, and the phase is held on within ±⅛ chip from the sync point.

In a block diagram of the sync circuit in FIG. 5, the sync circuit 57 includes a determining section 70, and a memory 71. FIG. 6 is a flowchart showing the first acquisition operation of the sync circuit. In FIG. 6, "PHASE" is the count value showing sequential changes of the phase of the de-spreading code 65 (PHASE=1, 2, . . . , N, where N is an integer and denotes the number of times of detection of the correlation value determined by the number of chips/phase increment, that is, the number of times of sampling). Suppose the number of chips is 127. The RSSI is the RSSI voltage 63 (see FIG. 1) when the count value is "PHASE". "PEAK" is the maximum value of the detected RSSI. "PEAKPHASE" is the count value when the RSSI is maximum.

First, the determining section 70 (see FIG. 5) sets initially at step S21 shown in FIG. 6, waits for a specific time (step S22), and samples the RSSI voltage every time the phase changes sequentially (step S23). Next, comparing if the presently sampled RSSI voltage has exceeded the hitherto maximum value or not (step S24), if exceeding, the RSSI is set as a new "PEAK", and the count value at this time is set as new "PEAKPHASE" (step S25). Then, judging if "PHASE" has exceeded N (in this case, N is 127/(½)=254) or not (step S26), and if exceeding, the first acquisition operation is terminated, and if not exceeding, the phase is advanced by ½ chip (step S27). At step S24, if judged not to be RSSI>PEAK, the process jumps to step S26. Thus, by storing "PEAK" as the maximum value of RSSI voltage sampled so far, when all steps of first acquisition operation in FIG. 6 are over, the maximum value of the final RSSI voltage is stored as "PEAK". When the first acquisition operation is complete, a second acquisition is operated in a range of 8 chips before and after "PEAKPHASE". At this time, by presetting the threshold level "DECRSSI" as shown in FIG. 7A and FIG. 7B, when the condition that the sampling value of the RSSI voltage in the second acquisition operation is lager than (PEAK−DECRSSI), it is judged that the sync acquisition is completed, and the operation moves to the sync hold-on mode.

In this method, however, in the absence of object signal, a maximum value caused by noises is obtained as shown in FIG. 7B. At this time, in the second acquisition operation, the sampling value of the RSSI voltage is the maximum value caused by noises. Its amplitude is about the same as that of PEAK, and this value exceeds (PEAK−DECRSSI) very often, thereby going to the sync hold-on mode easily. When moving thus to the sync hold-on mode by noises, the CPU 67 recognizes the asynchronous state by an out-of-sync detector 66, and sends out a reset command for returning to the sync acquisition mode. During this time, however, sync acquisition is not carried out, and hence it takes a longer time until the sync is established. Or, in the case of a cordless telephone based on the analog communication system, generally, data for monitoring the communication status is not exchanged, and it is hard to judge the asynchronous state completely during communication and it is also difficult to make an adequate reset. In this case, the data can be exchanged during communications, but the cost of the apparatus is increased and the circuit is complicated, and merits of analog communication system are sacrificed.

SUMMARY OF THE INVENTION

It is hence an object of the invention to present a spread spectrum communications apparatus heightened in the judging precision in sync acquisition and enhanced in performance, without increasing the number of parts or cost, and a synchronization acquisition method in the spread spectrum communications apparatus.

The spread spectrum communications apparatus of the invention has a receiver for receiving an RF spread spectrum modulated signal, and obtaining a primary modulated signal modulated by an information signal.

The receiver includes:
(a) an RF receiver for receiving an RF spread spectrum modulated signal,
(b) a de-spreader for generating an original primary modulated signal by using a de-spreading code from the RF spread spectrum modulated signal, and
(c) a sync circuit for performing synchronization acquisition operation composed of a first acquisition operation for synchronizing the received RF spread spectrum modulated signal with de-spreading code and a second acquisition operation following its completion, and detecting the correlation value of the RF spread spectrum signal and de-spreading code at every time of sequential change of phase value of the de-spreading code.

The sync circuit judges the maximum value of the correlation value from the correlation value for the number of times of detection in the first acquisition operation and the corresponding phase value, calculates the average of the correlation value for the number of times of detection, and compares to judge if the maximum value is larger than the threshold level defined by the sum of the average and the specified threshold level, and judges if the first acquisition operation is completed or not.

The synchronization acquisition method in the spread spectrum communications apparatus of the invention is as follows.

The synchronization acquisition method includes a first acquisition operation and a second acquisition operation following the completion of the first acquisition operation.

The first acquisition operation judges the maximum value of the =correlation value and the phase value corresponding to this maximum value from the correlation value for the number of times of detection of the correlation value determined in the relation of number of times of detection=(number of chips)/(phase increment of de-spreading code per detection)

and the corresponding phase value, and calculates the sum of the correlation values for the number of times of detection.

From the sum, the average of the correlation value is calculated, and it is compared if the following relation is established or not.

(maximum value of correlation value)>(average of correlation value)+(specified threshold level)

On the basis of the result of comparison, it is judged if the first acquisition operation is over or not.

Thus, the invention obtains the spread spectrum communications apparatus and its synchronization acquisition method capable of realizing a high judging precision in synchronization acquisition, without increasing the number of parts or costs of the spread spectrum communications apparatus.

DESCRIPTION OF THE PREFERRED EMBODIMENTS

Figure 1:
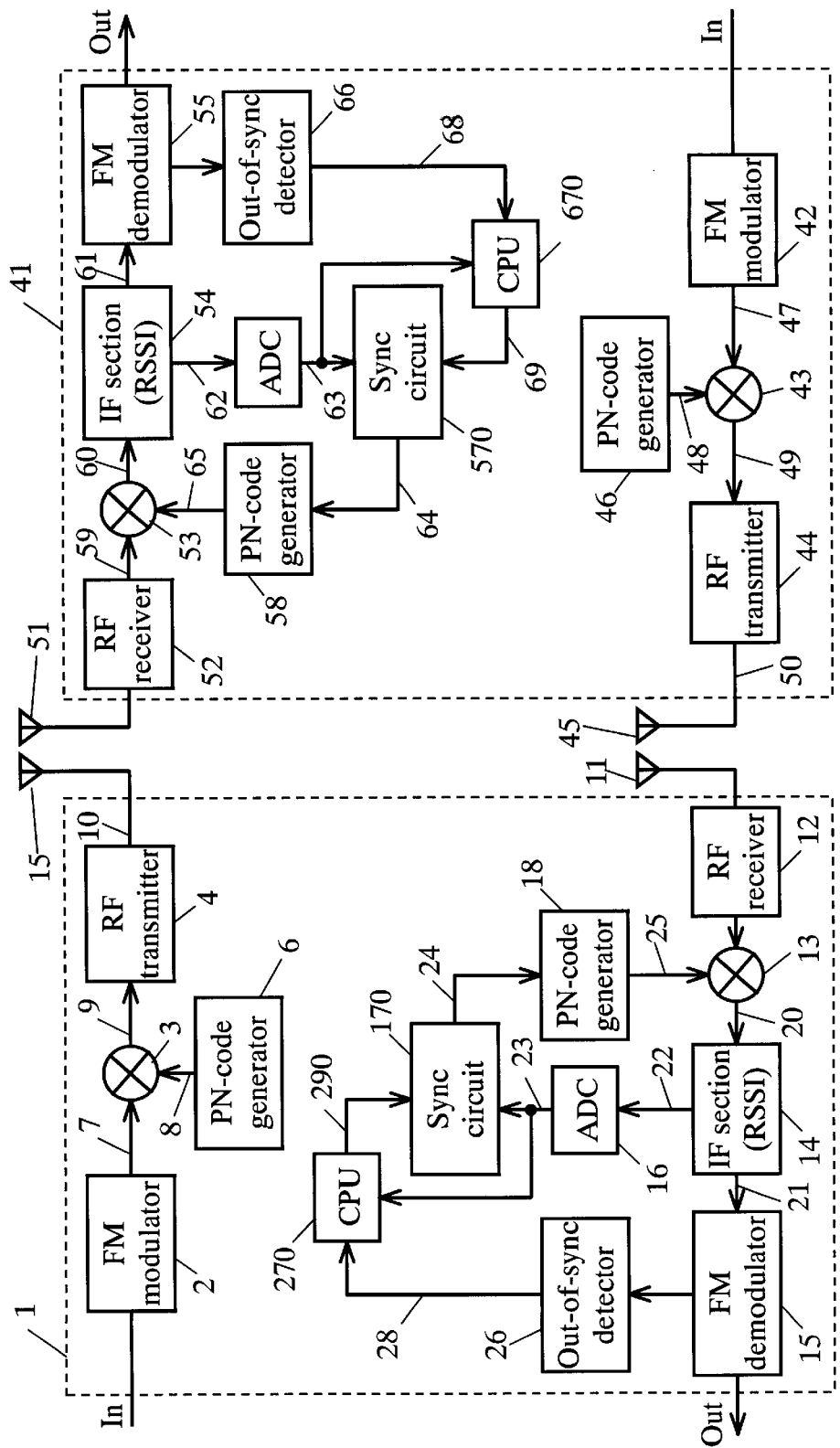
FIG. 1 is a block diagram showing an analog spread spectrum communications apparatus of the invention.

A preferred embodiment of the invention is described below while referring to the drawings.

Figure 2:
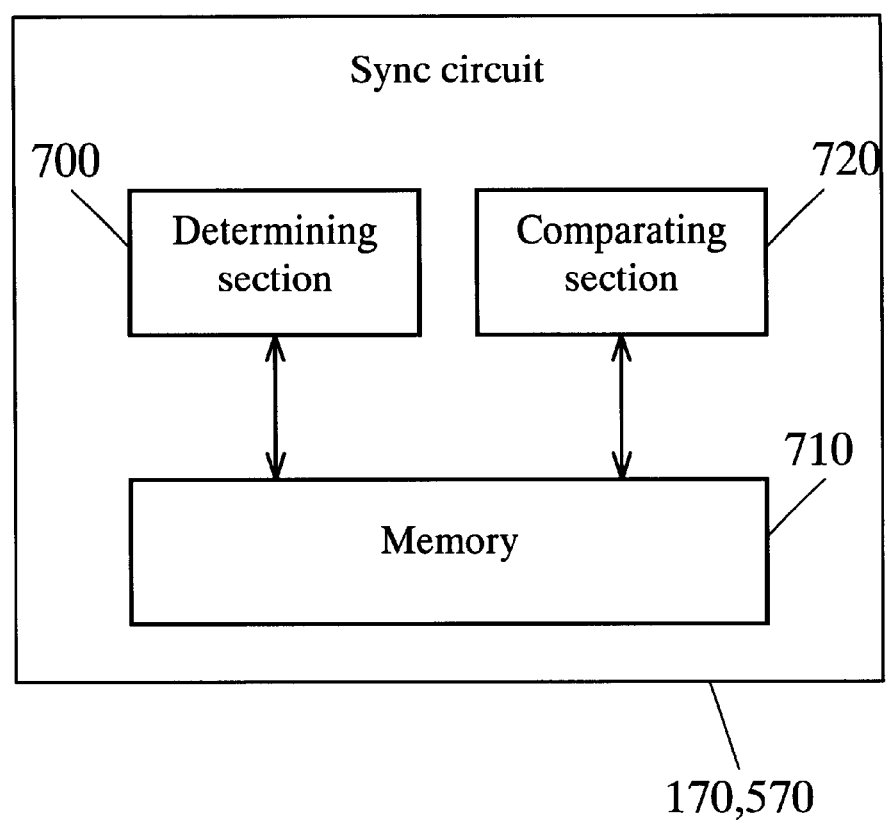
FIG. 2 is a block diagram showing a sync circuit for composing a spread spectrum communications apparatus in an embodiment of the invention.
Figure 8:
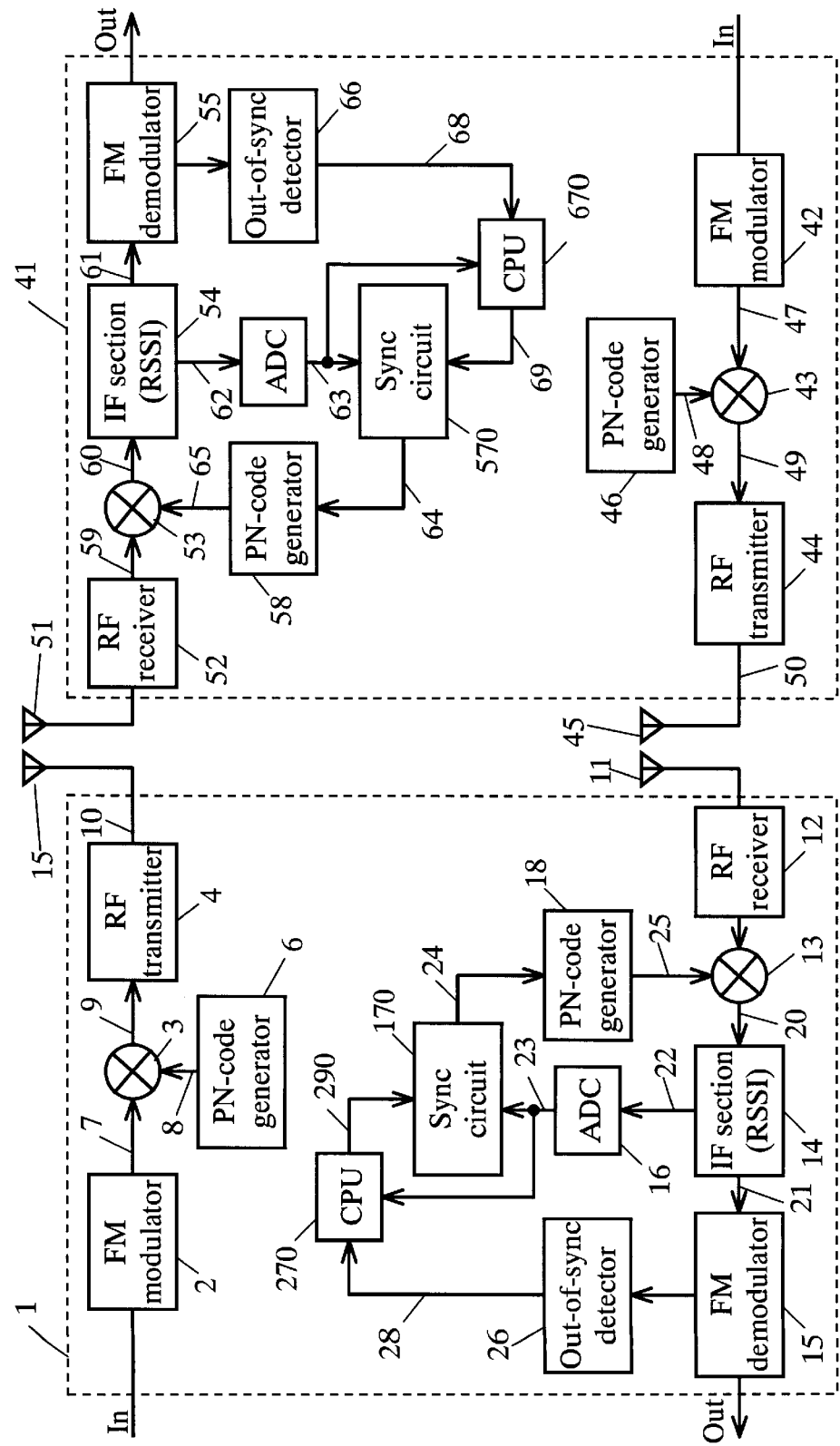
FIG. 8 is a block diagram showing a conventional analog spread spectrum communications apparatus.

Of the constituent elements of the spread spectrum communications apparatus of the invention, the constituent elements characterizing the invention are described. They are, in FIG. 1, a sync circuit 170 in the transmitter and a sync circuit 570 in the receiver. In FIG. 1, the same constituent elements as shown in FIG. 8 are identified with the same reference numerals as in FIG. 8. A block diagram of these sync circuits is shown in FIG. 2. The sync circuits 170 and 570 cooperate with CPUs 270 and 670.

In FIG. 2, the sync circuit 170 comprises a determining section 700, a memory 710, and a comparator 720. The determining section 700 and comparator 720 may be composed of either hardware or software, or both. A flowchart explaining the first sync acquisition operation of the sync circuit is shown in FIG. 3.

Figure 3:
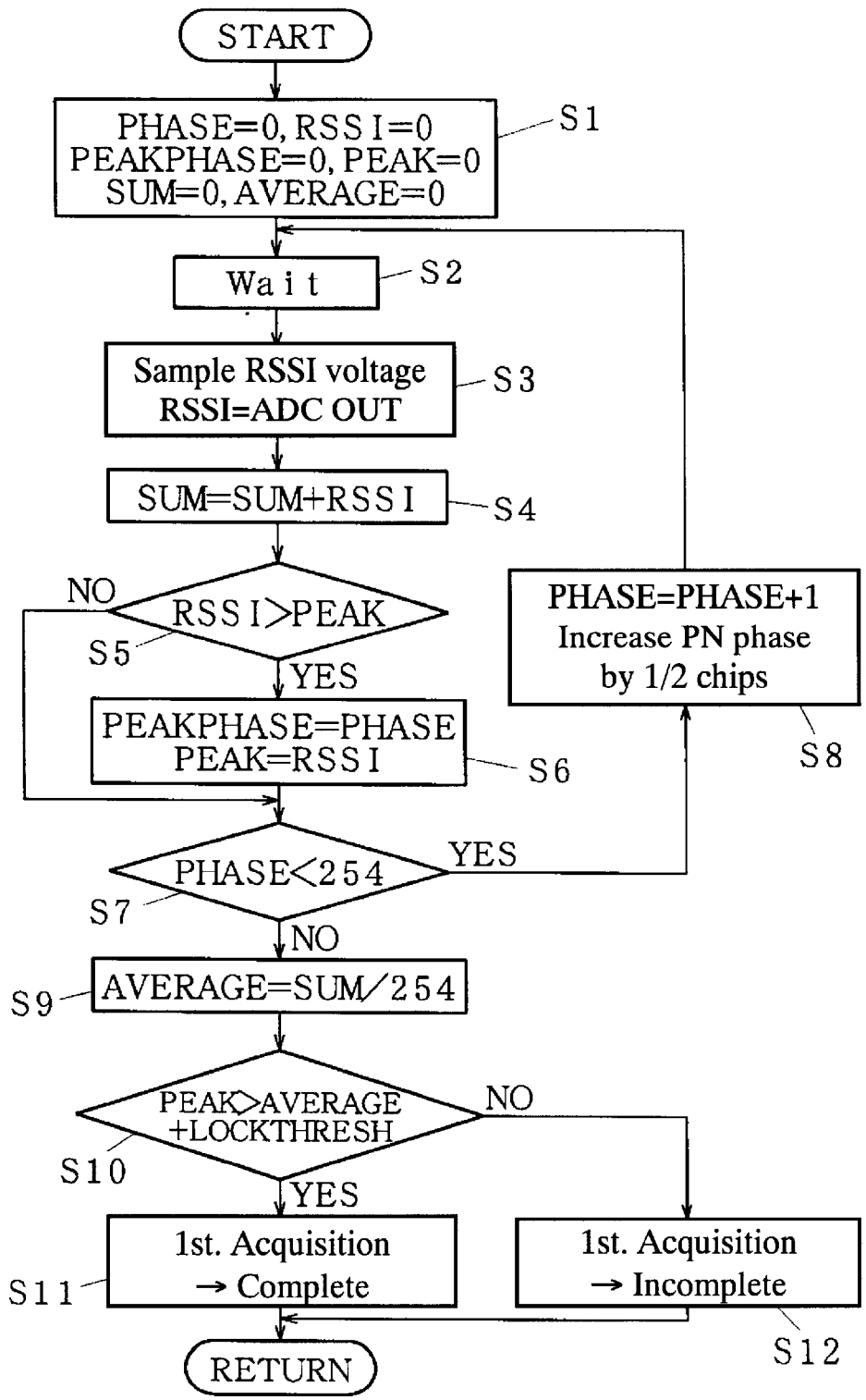
FIG. 3 is a flowchart showing the operation of the sync circuit for composing the spread spectrum communications apparatus in the embodiment of the invention.

The correlation value of spread spectrum modulated signals 19, 59 and de-spreading codes 25, 65 in FIG. 1 is obtained by sampling the RSSI voltages 23, 63 at every sequential change of the phase value of de-spreading codes 25, 65, and it is expressed as RSSI in FIG. 3. Herein, the number of times of sampling, that is, the number of times of detection of correlation value is the number of chips/(phase increment of de-spreading code per detection). In this embodiment, the number of chips is 127, and hence the number of times of detection of correlation value is 127/(½)=254.

First, setting initially (step S1);

Then, waiting for a specific time (step S2);

The determining section 700 samples the RSSI voltage (step S3);

Accumulating the RSSI voltage values to calculate SUM of the correlation values (step S4);

Comparing the presently sampled RSSI voltage to see if exceeding the hitherto maximum value (step S5);

If exceeding, this RSSI is set as a new PEAK, and the count value at this time is a new PEAKPHASE (step S6);

Judging if PHASE exceeds N or not (step S7);

If exceeding, the first acquisition operation is over, and if not exceeding, the phase is advanced by ½ chip (step S8);

After detecting all correlation values (steps S2–S8), the comparator 720 divides SUM calculated at step S4 by the number of times of detection, and calculates AVERAGE of correlation values (step S9);

Further, the comparator 720 judges if PEAK as the maximum value of correlation value in the first acquisition operation (PEAK at S10 in FIG. 3) is larger than the sum of AVERAGE and specified threshold level (LOCKTHRESH) or not (step 10), that is, if the relation $$PEAK > AVERGE + LOCKTHRESH \qquad (1)$$

is established or not; and

If established, it is determined that the first acquisition operation is completed (step S11).

Otherwise, the maximum value PEAK is not judged to be a desired value, and it is determined that the first acquisition operation is incomplete, and the first acquisition operation is conducted again to detect a new maximum value PEAK.

It is thus possible to prevent an error in judgement of completion of the first acquisition operation by noises only in the absence of PN code.

Figure 4A:
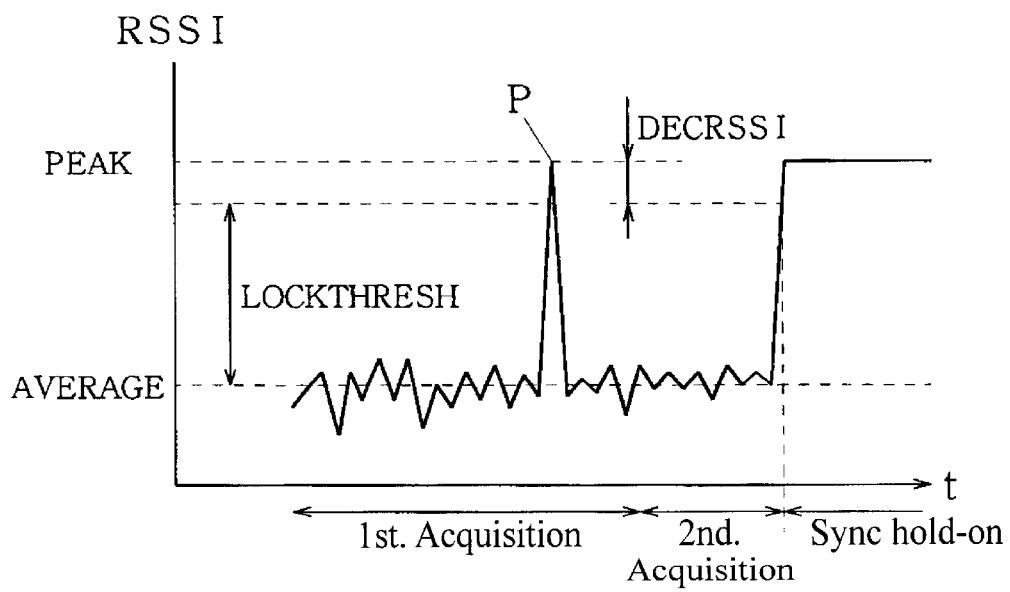
FIG. 4A is a graph showing changes of RSSI voltage on the time axis during synchronization acquisition operation of the sync circuit for composing the spread spectrum communications apparatus in the embodiment of the invention.
Figure 4B:
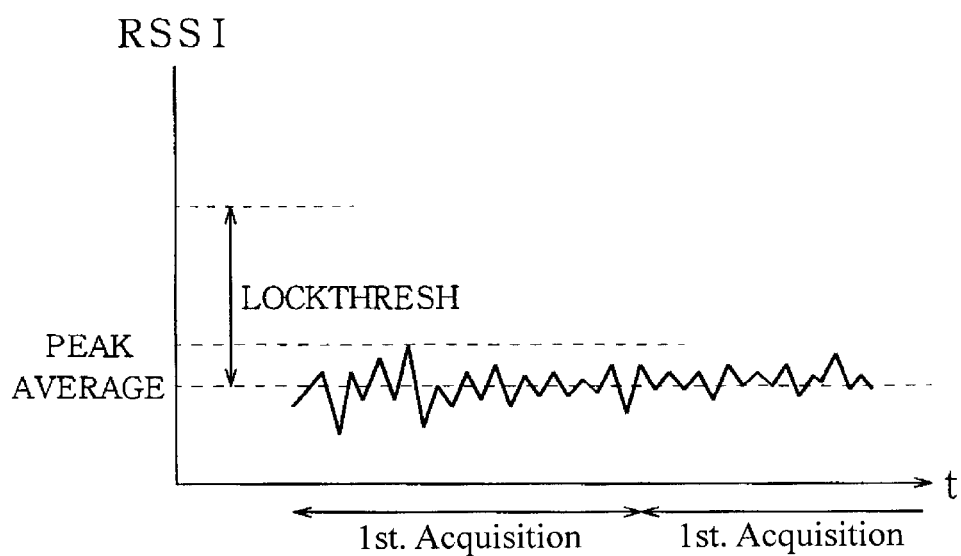
FIG. 4B is a graph showing changes of RSSI voltage on the time axis during synchronization acquisition operation of the sync circuit for composing the spread spectrum communications apparatus in the embodiment of the invention.
Figure 5:
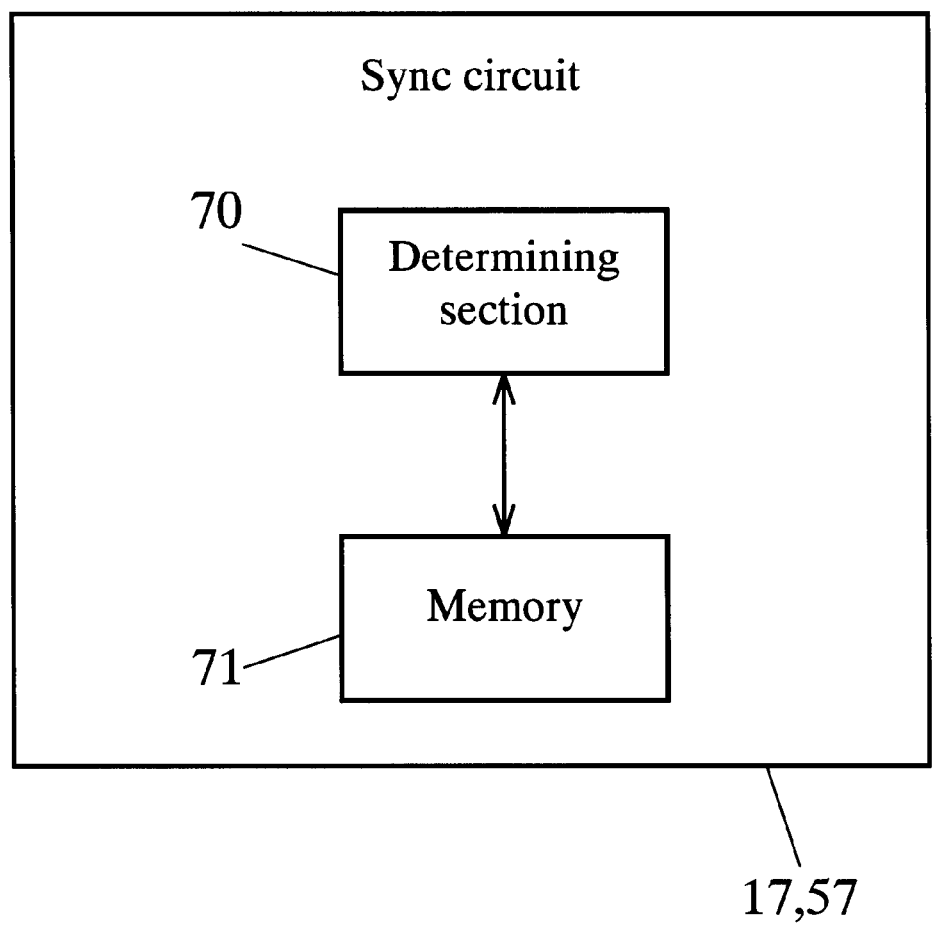
FIG. 5 is a block diagram showing a sync circuit for composing a spread spectrum communications apparatus in a prior art.
Figure 6:
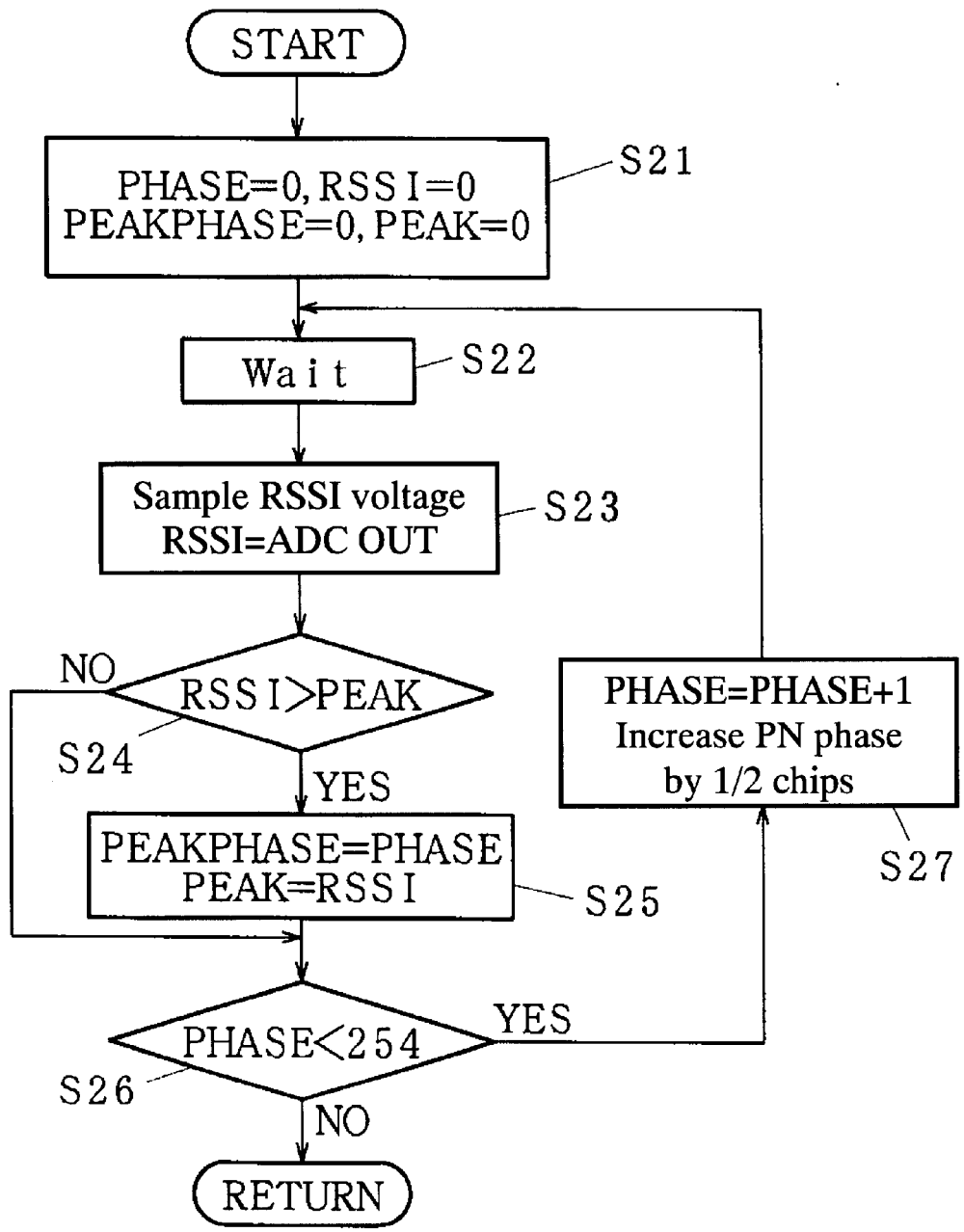
FIG. 6 is a flowchart (when the number of chips is 127) showing the operation of the sync circuit for composing the spread spectrum communications apparatus in the prior art.
Figure 7A:
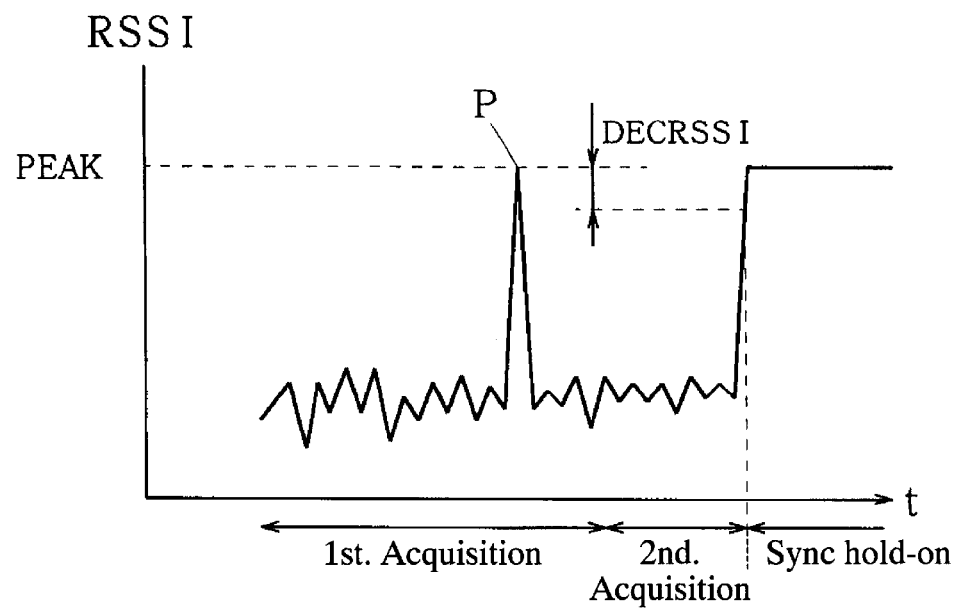
FIG. 7A is a graph showing changes of RSSI voltage on the time axis in sync hold-on mode of the sync circuit for composing the spread spectrum communications apparatus in the embodiment of the prior art.
Figure 7B:
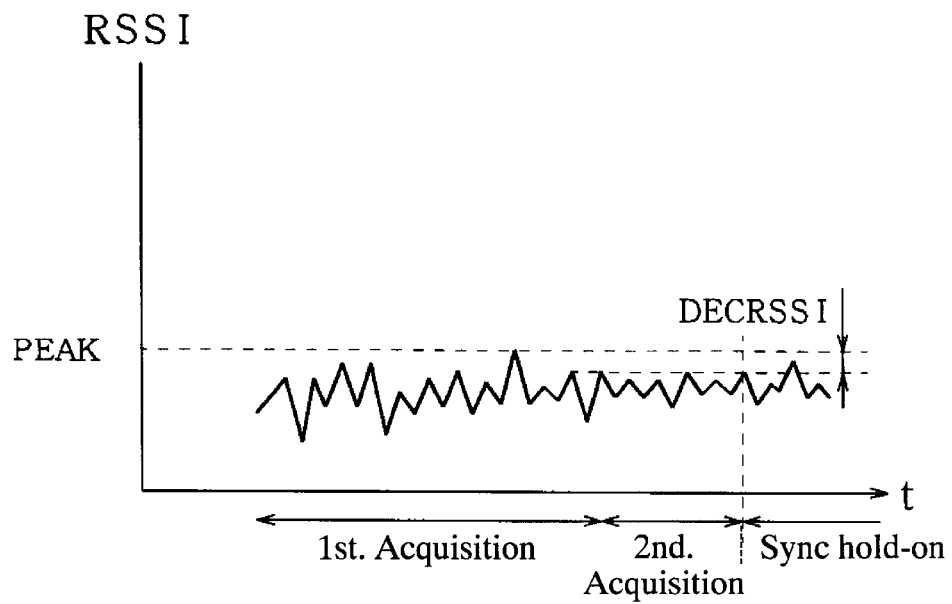
FIG. 7B is a graph showing changes of RSSI voltage on the time axis in sync hold-on mode of the sync circuit for composing the spread spectrum communications apparatus in the embodiment of the prior art.

Reference is next made to FIG. 4A and FIG. 4B to see how this sync acquisition operation is expressed specifically on the time axis. FIG. 4A and FIG. 4B are graphs showing the changes of the output voltages 22, 62 of RSSI shown in FIG. 1 on the time axis. FIG. 4A shows a case that a desired signal P is input, and FIG. 4B shows a case that no desired signal is input. As shown in FIG. 3, at the final step of the first acquisition operation, AVERAGE is calculated from all sampling values of RSSI voltage in the first acquisition operation period. The purpose of calculating the average is to establish the average level of the RSSI voltage in phases other than the sync point. Therefore, to be precise, the average should be calculated after removing PEAK from all sampling values of RSSI voltage. However, as in this embodiment, when the number of chips of PN code is large (127 in this example), and the number of times of sampling is large enough (herein 254), if PEAK is added, its contribution to the average is as small as negligible. Hence, for the sake of simplicity, it is calculated by adding all sampling values.

After calculation of AVERAGE, it is judged if PEAK of correlation values with respect to a predetermined threshold level (LOCKTHRESH) satisfies the relation of formula (1) or not. That is, it is judged if PEAK is a sufficiently high voltage with respect to the noise level. If this relation is not satisfied, that is, PEAK is not a sufficiently high voltage with respect to the noise level, as shown in FIG. 4B, PEAK is regarded only as a mere maximum value of noises, and it is judged that the first acquisition operation is not completed, and the first acquisition operation is repeated. To the contrary, when the relation is established, it is judged that the first acquisition operation is completed as shown in FIG. 4A, and the process advances to a second acquisition operation.

In FIG. 4A and FIG. 4B, meanwhile, a simple method may be considered by determining LOCKTHRESH with respect to PEAK by the absolute value, instead of the relative value of the RSSI voltage. However, except when the desired signal has arrived at a considerably large level, or the process gain or self-correlation value of the spread spectrum communications apparatus is extremely high, the signal cannot be suppressed completely to less than the noise level in the phases other than the sync point, so that AVERAGE of noise level of RSSI voltage increases. Therefore, as the threshold level to PEAK, the absolute value of RSSI voltage is not employed, but a relative value to AVERAGE is employed. Thus, the spread spectrum communications apparatus of the embodiment operates in a wide dynamic range.

Therefore, according to the embodiment, the sync circuits 170, 570 execute the synchronization acquisition operation being composed of the first acquisition operation and the second acquisition operation following the completion of the first one. The determining section 700 determines the maximum value of the correlation value and the phase value at this time, from the correlation value and phase value for the number of times of detection of the correlation value in the first acquisition operation determined from the number of chips and the phase increment of the de-spreading code per detection, and calculates the sum of the correlation values for the number of times of detection. The comparator 720 calculates the average of the correlation values from the sum, compares the maximum value with the sum of the average and specified threshold level, and judges if the first acquisition operation is completed or not depending on the result of comparison. Thus, unless the condition above is established, the process is not advanced from the first acquisition operation to second acquisition operation. Therefore, by using an appropriate threshold level, if only noise is generated without a spreading code, the first acquisition operation is not moved to the second acquisition operation, so that the first acquisition operation can be executed again.

As explained herein, according to the spread spectrum communications apparatus of the invention, if only noise is generated without a spreading code, by using an appropriate threshold level, the maximum value of the correlation value does not become larger than the sum of the average of correlation values and threshold level. At this time, the process is not changed from the first acquisition operation to the second acquisition operation. Therefore, the first acquisition operation can be repeated without advancing to the second acquisition operation. Accordingly the judging precision of synchronization acquisition is enhanced without increasing the number of parts or cost of the apparatus.

The synchronization acquisition method of the spread spectrum apparatus explained at step S1 to step S10 can be executed by other circuit composition or software. In such a case, too, a spread spectrum apparatus similarly enhanced in performance is obtained.

What is claimed is:

1. A spread spectrum communications apparatus for receiving an RF spread spectrum modulated signal and obtaining a primary modulated signal modulated by an information signal, comprising:
   a) an RF receiver for receiving said RF spread spectrum modulated signal,
   b) a de-spreader for generating said primary modulated signal from said RF spread spectrum modulated signal output from said RF receiver by using a de-spreading code, and
   c) a sync circuit for acquiring synchronization to synchronize said RF spread spectrum modulated signal and the de-spreading code, by performing a first synchronization acquisition operation by detecting a correlation value of said RF spread spectrum modulated signal and the de-spreading code in the synchronization acquisition operation at every sequential change of a phase value of the de-spreading code, and by performing a second synchronization acquisition operation,
   wherein the first synchronization acquisition operation judges a maximum value of the correlation value from the correlation values for the number of times of detection in the synchronization acquisition operation, and a phase value corresponding to the maximum value, calculates a sum of the correlation values for the number of times of detection, calculates an average of the correlation values from the sum, and judges if the synchronization acquisition has been established or not by comparing the maximum value with a sum of the average and a specified threshold level, and the second synchronization acquisition operation chances the phase of the de-spreading code before and after a phase corresponding to the maximum value.

2. The spread spectrum communications apparatus of claim 1, wherein the correlation value is an output value of a received signal strength indicator (RSSI) receiving said primary modulated signal output from the de-spreader.

3. The spread spectrum communications apparatus of claim 1, wherein the number of times of detection is determined by (number of chips)/(phase increment of the de-spreading code per detection).

4. The spread spectrum communications apparatus of claim 1, wherein said sync circuit further detects a correlation value corresponding to each phase value at every sequential change of a phase value of the de-spreading code before and after a phase value corresponding to the maximum value, and holds on a synchronization at a first phase value when the correlation value corresponding to each phase value exceeds a value of subtracting a further specified threshold level from the maximum value.

5. The spread spectrum communications apparatus of claim 1, wherein said sync circuit compares the maximum value with the sum of the average and the specified threshold level and judges if the synchronization acquisition operation is completed or not on the basis of the result of the comparison.

6. A spread spectrum communications apparatus for receiving an RF spread spectrum modulated signal and obtaining a primary modulated signal modulated by an information signal, comprising:
   a) an RF receiver for receiving said RF spread spectrum modulated signal,
   b) a de-spreader for generating said primary modulated signal from said RF spread spectrum modulated signal output from said RF receiver by using a de-spreading code,
   c) a sync circuit for acquiring synchronization to synchronize said RF spread spectrum modulated signal and the de-spreading code, by performing a first synchronization acquisition operation by detecting a correlation value of said RF spread spectrum modulated signal and the de-spreading code in this synchronization acquisition operation at every sequential change of a phase value of the de-spreading code, and by performing a second synchronization acquisition operation,
   d) an intermediate frequency section for generating an intermediate frequency signal from said primary modulated signal output from the de-spreader, and issuing a correlation value from the intermediate frequency signal, and
   e) an analog demodulator for demodulating the intermediate frequency signal and outputting said information signal,
   wherein said sync circuit further comprises a determining section for performing the first synchronization acquisition operation by judging a maximum value of the correlation value from the correlation values for the number of times of detection in the synchronization acquisition operation, and a phase value corresponding to the maximum value, and calculating a sum of the correlation values for the number of times of detection, and a comparator for calculating an average of the correlation values from the sum, and comparing the maximum value with the sum of the average and a specified threshold level and judging if the synchronization acquisition is established or not on the basis of the result of the comparison and wherein the second synchronization acquisition operation changes the phase of the spreading code before and after a phase corresponding to the maximum value.

7. The spread spectrum communications apparatus of claim 6, wherein the correlation value is an output value of a received signal strength indicator (RSSI) receiving said primary modulated signal issued from the de-spreader.

8. The spread spectrum communications apparatus of claim 6, wherein the number of times of detection is determined by (number of chips)/(phase increment of the de-spreading code per detection).

9. The spread spectrum communications apparatus of claim 6, wherein said sync circuit further detects a correlation value corresponding to each phase value at every sequential change of a phase value of the de-spreading code before and after a phase value corresponding to the maximum value, and holds on the synchronization at a first phase value when the correlation value corresponding to each phase value exceeds a value of subtracting a further specified threshold level from the maximum value.

10. The spread spectrum communications apparatus of claim 6, wherein the comparator compares the maximum value with the sum of the average and the specified threshold level and judges if the synchronization acquisition operation is completed or not on the basis of the result of the comparison.

11. The spread spectrum communications apparatus of claim 6, further comprising a transmitter, wherein said transmitter comprises an analog modulator for modulating an information signal and outputting a primary modulated signal, a spreader for generating a spread spectrum modulated signal from said primary modulated signal output from said analog modulator, and an RF transmitter for modulating the spread spectrum modulated signal output from said spreader into an RF signal, and transmitting as an RF spread spectrum modulated signal.

12. The spread spectrum communications apparatus of claim 11, wherein the number of times of detection is determined by (number of chips)/(phase increment of the de-spreading code per detection).

13. The spread spectrum communications apparatus of claim 11, wherein the comparator compares the maximum value with the sum of the average and the specified threshold level and judges if the synchronization acquisition operation is complete or not on the basis of the result of the comparison.

* * * * *